March 8, 1932. M. H. SPIELMAN 1,848,393
LIQUID DISPENSING DEVICE
Filed Nov. 12, 1930 2 Sheets-Sheet 1

Inventor
Milton H. Spielman
By Bates, Golrick & Teare
Attorneys

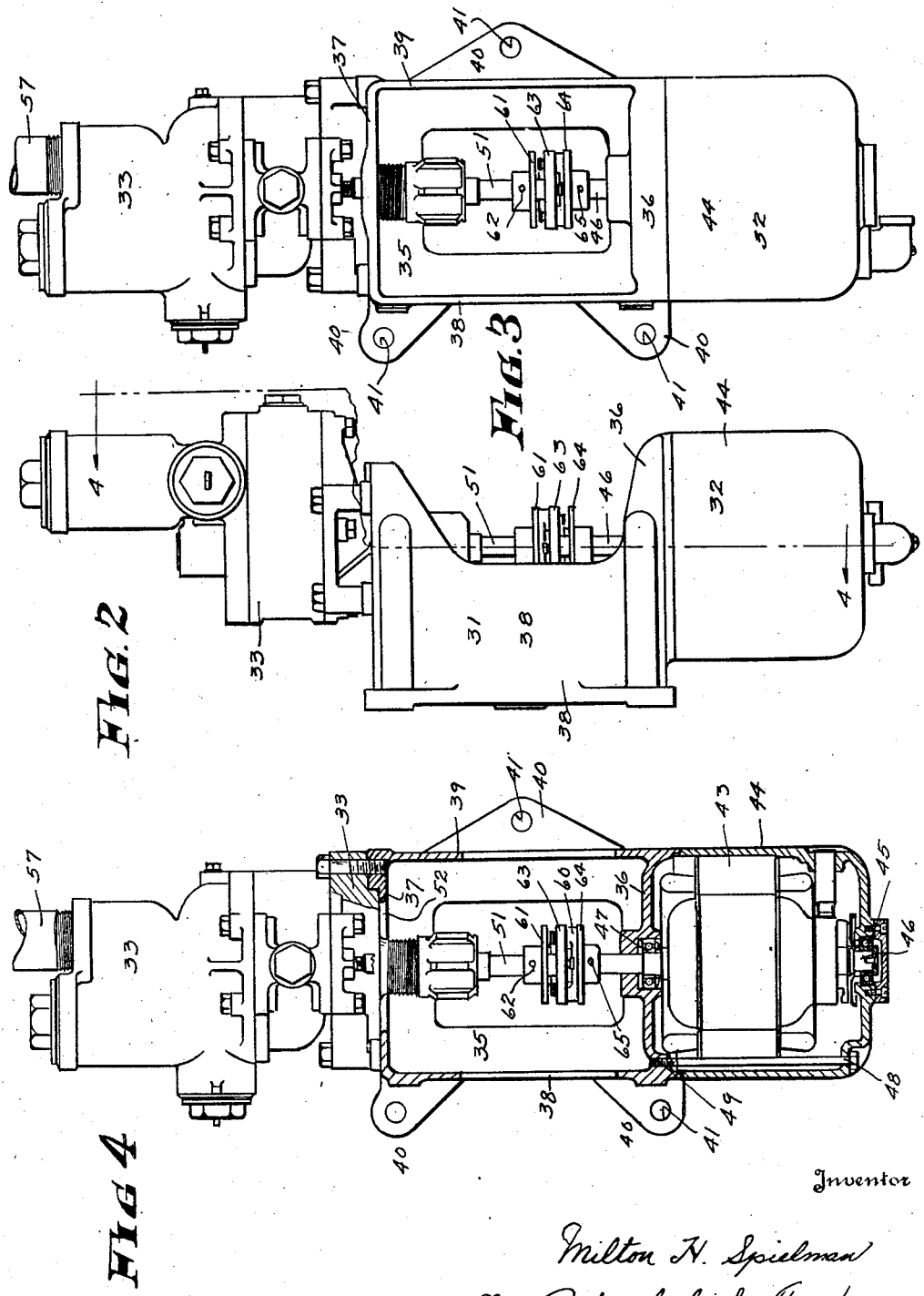

Patented Mar. 8, 1932

1,848,393

UNITED STATES PATENT OFFICE

MILTON H. SPIELMAN, OF CUYAHOGA FALLS, OHIO, ASSIGNOR TO THE BLACK AND DECKER ELECTRIC COMPANY, OF KENT, OHIO, A CORPORATION OF OHIO

LIQUID DISPENSING DEVICE

Application filed November 12, 1930. Serial No. 495,025.

This invention relates to a liquid dispensing device, and is particularly applicable to liquid measuring mechanisms, used in connection with the vending of gasoline and oils.

Devices such as the ordinary gasoline dispensing unit generally comprise a hollow, upright, casing, which rests adjacent the ground surface, and which, in many instances, supports a suitable measuring tank or unit, to which liquids are supplied from a storage receptacle, and from which such liquids are vended to the purchaser in measured quantities. In such a construction it is highly desirable that the dispensing tank or unit be a limited distance from the ground, to the end that the purchaser may conveniently see the measuring unit and permit gravity feed of the liquid to the customer's tank. It is also desirable that the casing be of a minimum cross-sectional area, to the end that it will occupy a minimum amount of ground space, as such is often required in congested business districts. As such casings are limited in height and cross-sectional area, they provide but little space to accommodate an enclosed power unit, generally comprising a motor and pump for filling the measuring tank or unit from the storage tank. Such power units, as heretofore have been provided, have been bulky, and when it became necessary to repair the power unit, either the pump or the motor, the entire unit was removed from the casing and often the entire piping system of the dispensing device was disrupted.

The general object of this invention, therefore, is to provide a dispensing device which will include a self-contained and conveniently housed power unit, which power unit will be readily removable from the casing of the device. A more specific object of the invention is to provide a liquid dispensing device, including a power unit comprising a suitable motor and pump, which may be mounted within the dispensing device, and wherein either the motor or the pump may be individually removed from the unit and from the dispensing device without disturbing either the other unit or other cooperating elements of the dispensing device, and thus facilitate the making of repairs by permitting part of the unit to be readily replaced without necessitating the loss of the use of the dispensing device for any appreciable length of time.

Other features of my invention will become apparent from the description and the essential novel features of the invention are set forth in the claims.

Figure 1:
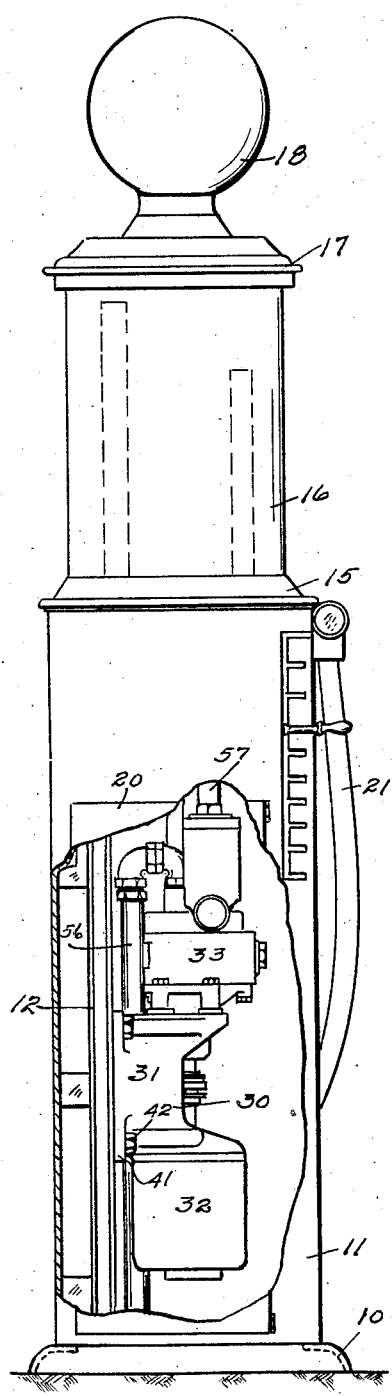
Figure 5:
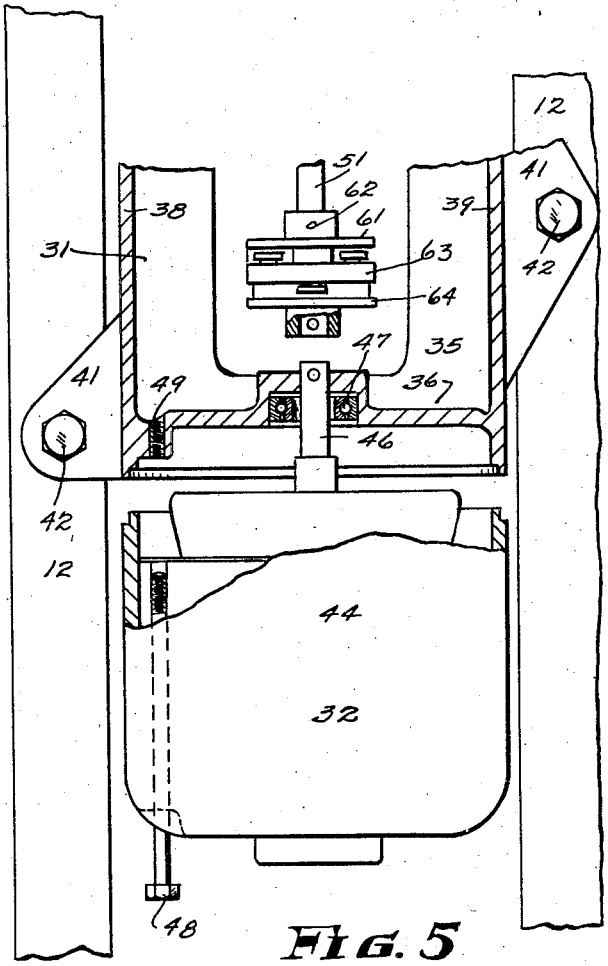

Referring now to the drawings, wherein a preferred embodiment of my invention is shown; Fig. 1 illustrates a dispensing device, embodying my invention, a portion of the casing thereof being broken away to more clearly illustrate the invention; Fig. 2 is an elevation of my power unit, detached from the casing; Fig. 3 is a side elevation of the unit illustrated in Fig. 2, looking at the right-hand side thereof; Fig. 4 is a vertical section through the unit and is indicated by the offset lines 4—4 on Fig. 2; Fig. 5 is an enlarged fragmentary elevation, partially in section, and illustrating the manner of removal of the motor.

In the drawings, I have shown my invention as applied to a gasoline dispensing device. Such dispensing device may comprise a hollow base member 10, adapted to support a suitable casing 11. The casing may be made of suitable sheet metal and secured to frame member 12, which also serves to support the power unit hereinafter described. Mounted above the casing 1, and carried by the frame 12, is a mounting plate 15 which supports a measuring device, such as the hollow glass cylinder 16 which is covered at its top by a cap 17. Above the cap is a suitable globe 18, which may include an incandescent lamp, (not shown) to illuminate the device.

Liquids, such as gasoline, are pumped or otherwise drawn from a reservoir, (not shown, but which is generally located below the ground) by a suitable pump unit, generally indicated at 30 in Fig. 1. This pumping unit is preferably confined within the casing 11, and pumps the liquid from the storage tank, into the measuring tank 16, where it is measured and dispensed in predetermined quantities to the purchaser by means of a suitable valve and flexible tubing 21. The power unit 30, as shown in the drawings, comprises a bracket 31, a motor 32, and a pump 33, and is supported by the vertical frame members 12 of the casing 10. The bracket 31 is a hollow, open, box-like structure, and comprises a rear wall 35, end walls 36 and 37, and suitable side walls 38 and 39. The rear wall is provided with a plurality of laterally extending ears 40, having openings 41 therein, through which suitable bolts 42 pass which secure the bracket to the frame members 12, as shown in Fig. 1.

The motor 32 is secured to the lower end or base 36 of the bracket 31, in such a manner as to be readily detachable therefrom and at the same time occupy a minimum amount of vertical space. The motor 32 comprises suitable field coils 43, which are mounted in a cup-shaped casing 44. The lower end of the casing is provided with a suitable bearing 45, which coacts with the lower end of an armature shaft 46. To minimize the vertical displacement of the motor, the lower face 36 of the bracket is convexly cupped, and is adapted to form the upper closure member or cap for the casing 44 of the motor, and is provided with a suitable bearing 47, which coacts with the upper end of the armature shaft 46. The motor is secured to the base 36 of the bracket by bolts 48, which pass through the lower face of the casing and are threaded to the base 36 of the bracket 30, as shown at 49, in Fig. 4.

The pump 32 may be of any of the well known compact types, which will efficiently force the liquid from the storage tank into the measuring tank. In the drawings, the pump is shown secured to the upper wall 37 of the bracket 30, by suitable bolts. The pump 33 is so mounted that its operating shaft 51 projects through an opening 52 in the wall 37 of the bracket, and which is aligned with the armature shaft 46 to the motor. To minimize the vertical displacement of the pump, it is advantageous to permit the shaft 51 and its associated packing gland assembly to extend through the bracket, as shown in Fig. 5.

Suitable connections are provided between the pump, the storage tank and the measuring unit.

In the drawings, such connections are shown by pipe lines 56 and 57, which lead to the storage tank and measuring unit, respectively, and which are joined to the pump by suitable unions 58.

The opening 52 in the wall 37, through which the packing glass and shaft project, is either slotted or made slightly larger than the shaft, so that the pump may be moved horizontally to permit its removal with a minimum disturbance of the piping, which connects the pump to the storage tank and to the measuring unit.

The pump shaft 51 and the armature shaft 46 are joined in such a manner that they may be readily disconnected. To this end I provide a flexible coupling 60, which may be of any well known type. In the drawings, this coupling 60 is shown as comprising a rigid attaching disk 61, which is secured in position on the pump shaft 52 by a suitable set screw or pin 62. The disk 61 is connected to a resilient disk 63, which, in turn, is connected to a second attaching disk 64, secured to the armature shaft 46, by a suitable set screw or pin 65.

When it is desired to remove the entire assembly from the casing, the pipe connections to the pump, the electrical connections to the motor are first removed, and then the bolts 42 which hold the bracket 31 in place on the frame 12 are removed, and the entire unit 30 may then be withdrawn from the casing 11, through a suitable door 21, shown in Fig. 1.

When it is desirable to remove only the motor 32 from the casing, the set screw 65 is first removed from the coupling 60, and the bolts 48 are withdrawn from the bracket. The motor, with its armature and other associated parts, in then pulled downward, as illustrated in Fig. 5, and removed from the bracket. To minimize the height of the casing, I prefer to use a hollow base member 10, so that when the motor is withdrawn from the bracket it may be dropped into the base, thereby bringing the end of the armature shaft below the bottom of the bracket. The motor is then tilted and withdrawn from the casing 11, through the door 21.

It is also desirable to permit the pump to be removed without disturbing the balance of the unit. In this instance it is only necessary to remove the pipe connections from the pump and move the pump slightly horizontally until it is clear of the piping, raise the pump until the shaft is above the bracket, from which position it may be readily tilted and withdrawn downwardly from the casing through the door 21.

It is therefore apparent that I have provided a power unit for a liquid dispensing device, which power unit may be disposed entirely within the confines of the enclosure which supports the structure, and which power unit may readily be removed from the structure as a unit, or certain parts thereof may be removed independent of the remaining parts. It is also apparent that the motor or pump may be removed by disturbing a minimum number of pipe connections, thereby minimizing the possibility of subsequent leaks, loss of fuel and the attendant fire hazards.

I claim:

1. In a power unit, for use in conjunction with a dispensing device, the combination of a motor, a pump disposed above the motor, a vertically extending driving connection between said motor and pump, a common support for said motor and pump, said support adapted to be secured to the dispensing device, and wherein either the motor or the pump may be removed from the dispensing device without disturbing the other or without disturbing the connection between the support and the dispensing device.

2. In a power unit of the character described, a supporting bracket adapted to be secured to a structural unit, a pump secured to said bracket, a motor secured to said bracket, wherein the bracket forms a portion of the motor housing, and a separable driving connection between the motor and the pump.

3. A power unit adapted for use in a dispensing device, comprising a bracket member having spaced parallel outstanding walls having openings therein, a pump element including a drive shaft detachably secured to one of said walls, said drive shaft extending through openings in said wall, a motor detachably secured to the other of said walls, the motor including a drive shaft adapted to extend through the opening in its associated wall, and a coupling associated with both of said shafts and disposed intermediate said walls.

4. In a power unit of the character described, a supporting box-shaped bracket adapted to be secured to a structural unit, a pump secured to said bracket, a drive shaft associated with said pump and extending into the confines of the bracket, a motor secured to said bracket, wherein the bracket forms a portion of the motor housing, a drive shaft associated with said motor, and a driving connection between said shafts wherein said connection lies within the confines of the bracket.

5. A power unit adapted for use in a dispensing device, comprising a bracket member having oppositely disposed spaced parallel walls, having openings therein, a pump unit including a drive shaft detachably secured to one of said walls, said drive shaft extending through the opening in said wall, a motor detachably secured to the other of said walls, the motor including a drive shaft in axial alignment with the first-named shaft and adapted to extend through the opening in its associated wall, and a coupling associated with both of said shafts and disposed intermediate said walls.

In testimony whereof, I hereunto affix my signature.

MILTON H. SPIELMAN.